May 24, 1966 M. F. HEILWEIL ETAL 3,253,214
TEST APPARATUS FOR DETERMINING THE OPENING AND CLOSING
CHARACTERISTICS OF ELECTROMAGNETIC SWITCHING
DEVICES UTILIZING LOGIC CIRCUITRY
Filed Dec. 28, 1961 3 Sheets-Sheet 1

INVENTORS
MELVIN F. HEILWEIL
FRANCIS J. SOYCHAK
BY Francis V. Giolma
ATTORNEY

United States Patent Office 3,253,214
Patented May 24, 1966

3,253,214
TEST APPARATUS FOR DETERMINING THE OPENING AND CLOSING CHARACTERISTICS OF ELECTROMAGNETIC SWITCHING DEVICES UTILIZING LOGIC CIRCUITRY
Melvin F. Heilweil, Wappingers Falls, N.Y., and Francis J. Soychak, South Burlington, Vt., assignors to International Business Machines Corporation, New York, N.Y., a corporation of New York
Filed Dec. 28, 1961, Ser. No. 162,829
1 Claim. (Cl. 324—28)

This invention relates generally to test apparatus and it has reference in particular to test apparatus for electromagnetic switching devices such as reed switches, relays and the like.

More specifically, the present invention relates to a reliable and inexpensive tester for reed switches.

One object of the invention is to provide a reed switch tester which checks a switch for every operation of the contacts.

Another object of this invention is to provide for testing both the contact opening and contact closing of switch contacts with separate indications of which type of failure occurs.

Yet another object of the invention is to provide a reed switch tester which is sensitive to even momentary satisfactory operation of the contacts to open or close within a predetermined interval of time.

It is also an important object of the present invention to provide for simultaneously operating a plurality of relays or switches from an oscillator and for disabling the oscillator when any one of the switches fails to close or open within a predetermined interval of time.

In practicing the invention in accordance with one embodiment thereof, an oscillator is arranged to apply pulses to a reed switch or relay under test and to logic circuitry including a latch, along with pulses controlled by the relay or switch contacts. Nor logic output circuits controlled by pulses from the oscillator, switch and latch operate to disable the ocillator and indicate a faulty switch as well as whether the failure was a failure to open or close.

The foregoing and other objects, features and advantages of the invention will be apparent from the following more particular description of preferred embodiments of the invention as illustrated in the accompanying drawings.

In the drawings:

FIGS. 1a and 1b, considered together, provide a schematic diagram of a reed switch tester embodying the invention in one of its forms;

FIG. 3 is a circuit diagram of the amplifier used in FIG. 1a; and,

As hereinafter referred to, a Nor circuit is a logic circuit which provides an output so long as no signal is applied to any one of one or more inputs. If a signal is applied to any one or more of the inputs, no output results.

Figure 1A:
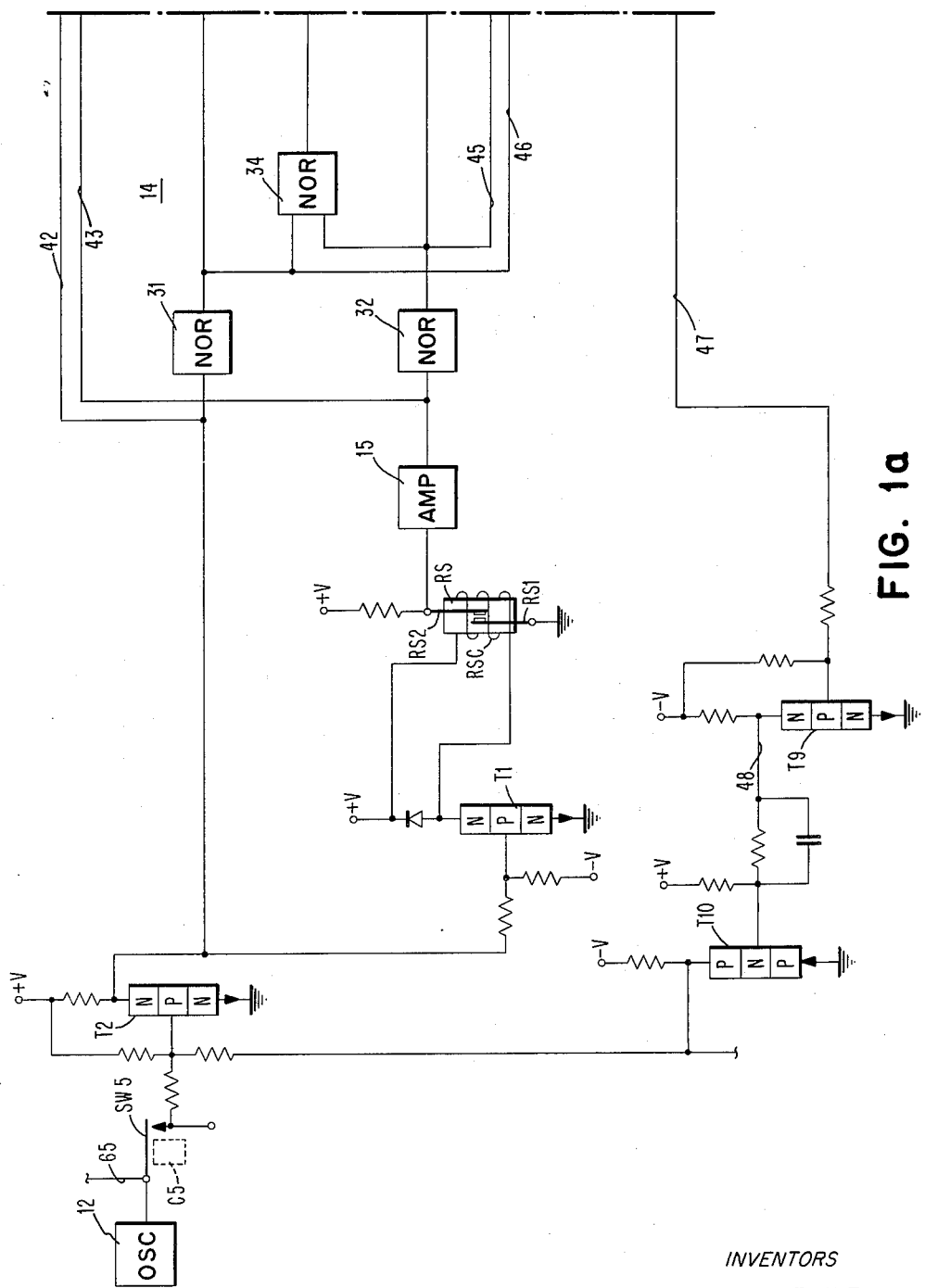
Figure 1B:
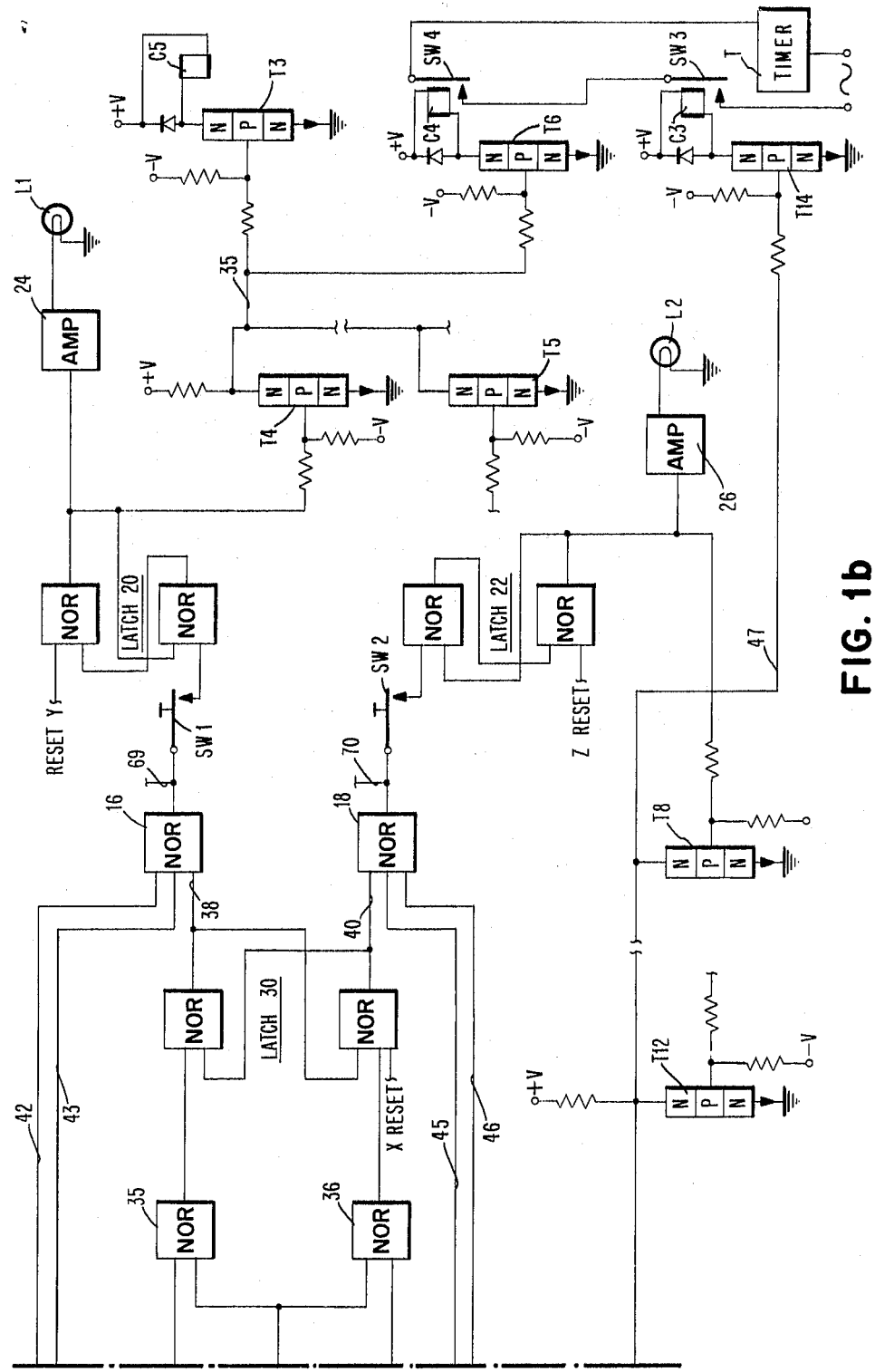

Referring particularly to FIGS. 1a and 1b, the reference character RS designates one of a plurality of reed switches under test each having relatively movable contacts RS1 and RS2 of a magnetic material disposed to be actuated by an operating winding RSC to make contact. The operating winding RSC is connected to a source of potential through a transistor T1 which is controlled by positive pulses applied thereto through an inverter-amplifier transistor T2 from an oscillator 12 through a switch SW5.

The oscillator frequency may be controlled to vary the pulse width and thus accommodate different switch operating times. Pulses from the oscillator transistor T2 are also applied to logic circuitry 14 comprising a plurality of Nor logic circuits. The contact RS2 of the reed switch RS is also connected through an amplifier 15 to the logic circuitry 14 for applying positive pulses thereto for controlling a pair of Nor circuits 16 and 18 to provide indications for failures of the contacts to open and close.

The outputs of the circuits 16 and 18 are applied through control switches SW1 and SW2 to latches 20 and 22 comprising a plurality of feedback connected Nor circuits for maintaining output indications in response to even momentary inputs from their respective Nor circuits 16 or 18. The output of the latch 20 is utilized to control an indicating lamp L1 through an amplifier 24, and is also used to control the operation of switch SW5 to render the oscillator ineffective by controlling the energization of the operating winding C5 through an amplifier transistor T3. The operation of transistor T3 is controlled by any one of a plurality of transistors represented by the two transistors T4 and T5 which are turned on by the output of the latch 20 or a corresponding latch of another reed switch under test, respectively. The transistors T4 and T5 are also utilized to control the operation of a switch SW4 which controls a timer T to indicate the time of the first failure of the reed switch. The operating winding C4 of the switch SW4 is controlled by a transistor T6 in response to a drop in the output signal of the transistor T4, the transistor T4 being off during normal test operation and transistor T6 being normally conductive during test operations to hold the switch SW4 closed.

The latch 22 which indicates a failure of the contacts to open is utilized to control an indicator lamp L2 through an amplifier 26. The output from the latch 22 is also utilized to control the timer T and to disable the oscillator 12 through a plurality of transistors represented by transistors T8, T12, transistor-amplifier T9, and clamp-transistor T10, being utilized to clamp the output of the oscillator in the event of a failure of the switch to open, and a transistor T14 being used to control winding C3 of timer switch SW3. The plurality of other transistors similar to the transistor T8 and represented by the transistor T12 may be also utilized to control the timer and the output of the oscillator 12 in response to signals from other switches under test.

The logic circuit 14 comprises basically a latch 30 responsive to oscillator and relay contact signals for controlling the Nor circuits 16 and 18, along with oscillator and relay contact signals to the Nor circuits. A pair of single input Nor circuits or inverters 31 and 32 receive the positive signals from the oscillator inverter-transistor T2 and from the reed switch contact amplifier 15, respectively. The output signals from the Nor circuits 31 and 32 are applied to Nor circuits 35 and 36 through a common Nor circuit 34 and also directly to the Nor circuits 35 and 36, respectively. The output of the Nor circuit 35 is utilized to set the latch 30 while the output of Nor circuit 36 resets the latch. Thus the latch 30 will normally be set when the output from T2 rises, and reset when the output from T2 falls.

With the reed switch RS connected for test, this being one of a plurality of reed switches being tested, switches SW1 and SW2 closed, power is applied to the circuit and reset pulses are then applied to terminals X, Y, Z of the latches 30, 20 and 22. Under these conditions, with no output from the latch 20, the transistor T4 will be non-conducting and conductor 35 will be up at the polarity of the voltage source so that transistor T3 is conducting and the operating winding C5 of switch SW5 is energized to close the switch SW5 and enable or render oscillator 12 effective. Likewise, transistor T6 will be conductive so that the operating winding C4 of the switch SW4 is energized, closing the switch SW4. Transistor T14, controlling the energization of the operating winding C3 of switch SW3, will also be conducting so that the switch SW3 is closed and the timer T will be connected to operate.

Switch SW5 being closed, pulses will be applied from the oscillator 12 to the logic circuitry 14 through transistor T2 and to the operating winding RSC of the reed switch RS under test through transistor T1. Positive pulses are therefore applied to the Nor circuits 31 and 32, the pulse to the Nor circuit 32 being delayed by the operating time of the reed switch RS. Under normal operating conditions, with both the transistor-oscillator T2 output down and the switch operating winding RSC de-energized, the input to the amplifier 15 is positive and the output thereof is at a negative level. Under these conditions the output line 38 of the latch 30 is at a positive level and the output line 40 is at a negative level. Since the input line 42 of the Nor circuit 16 is at the negative level as is also the input line 43, the output at the switch SW1 is down for a zero signal. Likewise, the input lines 45 and 46 to the Nor circuit 18 are at the positive or up level so the output at the switch SW2 is at the negative or zero level. Accordingly, neither the latch 20 nor the latch 22 is operated and the windings C5, C4 and C3 remain energized and the oscillator 12 continues to run.

When the output of the transistor driver T2 first rises, the reed switch will not have closed so that the input line 42 to the Nor circuit 16 goes positive while the input line 43 remains negative and line 38 goes negative. The input line 40 to the Nor circuit 18 goes positive while the input line 46 goes negative and input 45 remains positive. The outputs of Nor circuits 16 and 18 therefore remain at the negative or zero level.

When the reed switch RS operates, while the transistor T2 output signal is still positive, input line 43 to the Nor circuit 16 will go positive and the output remains at the zero or ground level while the input line 40 to the Nor circuit 18 remains positive, the input line 45 going to the zero level and input line 46 remaining negative, so that the output of the Nor circuit 18 is also at the zero or ground level. This indicates a valid opening condition of the reed switch RS. The latch 30 is thus set by the rise of T2 output while the switch is not yet closed and is reset by the fall of T2 output while the switch is still closed, to indicate a normal transient condition.

If the reed switch had failed to close when the T2 output was up, then, when the T2 output again falls to zero, all three inputs to the Nor circuit 16 will be at the zero level, giving a positive output. This sets the latch 20 and the output signal to the amplifier 24 turns on the indicating light L1, indicating a fault condition. At the same time, the signal from the latch 20 is applied to the base of the transistor T4 causing it to conduct and drop the level of the output line 35. This causes the transistor T3 to turn off, de-energizing operating winding C5 of the switch SW5 and rendering the oscillator ineffective so far as the faulted switch by disconnecting the test circuit from the oscillator. At the same time the transistor T6 is rendered non-conductive, de-energizing the operating winding C4 of the switch SW4, so as to open the circuit to the timer T and indicate the time of the fault. The circuit may be reset by applying pulses to the reset terminals X, Y and Z. If the fault is removed, the circuit will continue to operate. If the fault continues, the faulty reed switch may be removed and replaced by another switch.

Should the contacts of the reed switch fail to open after they have closed, when the transistor T2 output signal drops, the input line 42 to the Nor circuit 16 will be at the zero level, while the lines 43 and 38 are at the plus level. At this time, the input lines 40 and 45 to the Nor circuit 18 will be at the zero level while the input line 46 is at the plus level. When the transistor T2 output line rises at the beginning of the next pulse, all three input lines to the Nor circuit 16 will be at the plus level so that the output is at the zero level. All three inputs to the Nor circuit 18 will, however, now be at the down or zero level so that a positive output is applied by circuit 18 to the switch SW2. This sets the latch 22 and applies a positive signal to the amplifier 26 to turn on the indicating lamp L2 to indicate a fail-to-open condition. The signal from the latch 22 is also applied to the transistor T8, causing it to conduct and thus dropping the level of the line 47. This turns the transistor T14 off and de-energizes the operating winding C3 of switch SW3, opening the circuit to the timer T so as to indicate the time of the fault. The dropping of the level of the line 47 also turns transistor T9 off so as to drive line 48 more negative. This turns on transistor T10 and clamps the output of the oscillator 12 at the positive level at the input to the amplifier-transistor T2, thereby turning T2 on and dropping the T2 output, thus effectively disabling the oscillator.

In one embodiment of the invention, a Tektronic, Inc. 105 generator was used as the oscillator 12, generating 5-millisecond negative pulses at 5-millisecond intervals. The frequency is variable from 20 cycles per second to one megacycle and the pulse width is variable. The reed switches tested operate in approximately 1 millisecond and release in approximately 200 microseconds.

Figure 2:
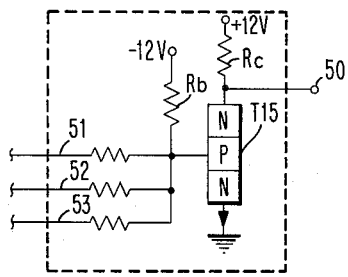
FIG. 2 is a circuit diagram showing the details of the Nor circuitry used in FIGS. 1a and 1b.

Referring to FIG. 2, T15 designates a transistor of the NPN type having its emitter connected to ground and having its collector connected to the positive terminal of a source through a 1.6K collector resistor Rc. The base electrode of the transistor T15 is connected to the negative terminal of a source through a 33K resistor Rb so that the transistor T15 is normally in the non-conducting condition and the output level at terminal 50 will normally be at the potential of the positive terminal of the source. A plurality of input lines 51, 52, 53 are connected to the base electrode of the transistor T15 through 5.6K resistors. When a positive signal is applied to any one or more of the input terminals 51–53, the transistor T15 is rendered conductive and the output level of terminal 50 is reduced to substantially the ground level. Accordingly, with no input signal, the output terminal is at the up level and, with any one or more input signals, the output terminal is at a ground level. This circuit is typical of the Nor circuits utilized in the described embodiment of the invention.

Figure 3:
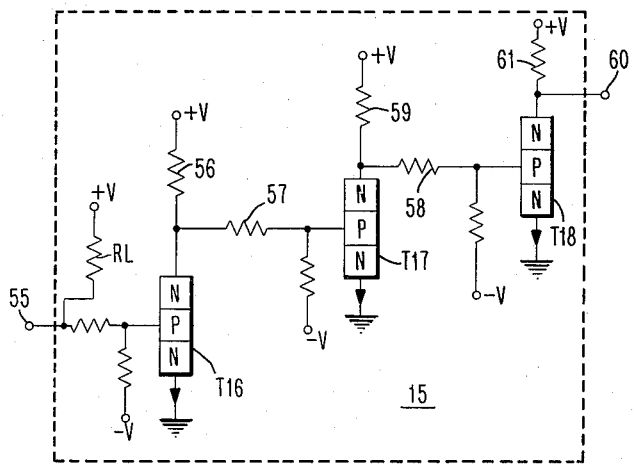

Referring to FIG. 3, the circuitry of the amplifier 15 shown in FIG. 1a is shown in detail. With the input terminal 55 connected to the positive terminal of the source, through a load resistor RL, and the contacts of the reed switch open, the terminal 55 will be sufficiently positive to render the transistor T16 conductive. Since the collector of the transistor T16 is connected to the positive terminal of the source through a 1.6K resistor 56, line 57 will be down to substantially ground level. This renders transistor T17 non-conductive and raises the level on line 58 since it is connected to the ground side of the collector resistor 59. Line 58 being up, transistor T18 will be conductive and the output terminal 60 will be at substantially ground level since it is connected to the collector side of the collector resistor 61.

Instead of utilizing a single timer T controlled by switches SW3 and SW4 and having the oscillator 12 effectively disabled by switch SW5 upon the occurrence of a faulty operation of a reed switch as in FIGS. 1a and 1b, it may be desirable to permit the oscillator 12 to continue to operate so that a plurality of other switches connected to conductor 65 for test along with the switch RS may continue to operate. To accomplish this purpose, the switch SW5 may be omitted, the switch SW4 may be utilized to control one timer for indicating the time of failure to close and the switch SW3 may be utilized in a similar manner to operate a separate timer (not shown) for indicating the time of the failure to open.

Figure 4:
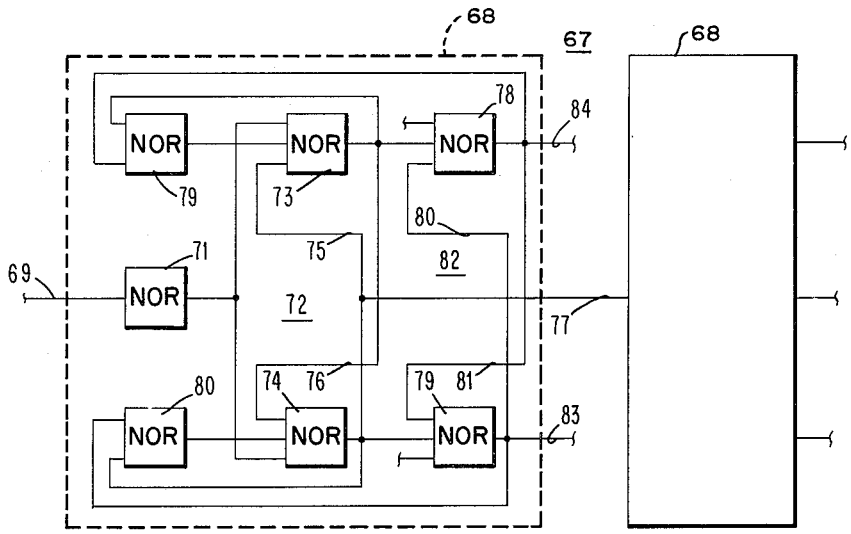
FIG. 4 is a schematic diagram of a binary counter which may be used in connection with a modified form of the invention.

Recording means such as the binary counter 67 of FIG. 4 may be connected to each of conductors 69 and 70 at the output of the Nor circuits 16 and 18 for counting the number of faulty operations of the reed switch RS. The counter 67 may comprise a plurality of stages 68 each comprising seven Nor circuits connected as indicated. The input conductor 69 to Nor circuit 71, which being a single input Nor circuit comprises an inverter, may be connected, for example, to the conductor 69 at the output of the Nor circuit 16. The output of the Nor circuit 71 may be applied to a latch 72 comprising Nor circuits 73 and 74 with feedback connections 75 and 76 to provide an output 77 to the next stage 68 from conductor 75. Additional Nor circuits 78 and 79 connected to the outputs of Nor circuits 73 and 74 and having feedback connections 80 and 81 provide a latch 82 true and complemented outputs on conductors 83 and 84.

When the first pulse is applied to conductor 69, a true output appears at conductor 83 while conductors 84 and 77 remain down. Upon the next pulse, an output appears on conductors 77 and 84 to drive the next stage while conductor 83 drops. Successive stages are driven in sequence as in any binary counter.

While the invention has been particularly shown and described with reference to preferred embodiments thereof, it will be understood by those skilled in the art that the foregoing and other changes in form and details may be made therein without departing from the spirit and scope of the invention.

What is claimed is:

In a tester for determining the opening and closing characteristics of a switch or the like having relatively movable contact means and an operating winding for effecting relative movement thereof, (a) a latch having a pair of input terminals, a pair of output terminals and a reset terminal for predetermining the condition of the latch, (b) a pair of Nor logic circuits, each having a pair of inputs and an output connected one to each input terminal of the latch, (c) an additional Nor circuit connected to an input of each of said pair of Nor circuits and having a pair of inputs, (d) an inverter connected to each input of said additional Nor circuit and to the other input of each of the pair of Nor circuits, (e) an additional pair of Nor circuits connected for separately determining the opening and closing characteristics, each having an output and a plurality of inputs, (f) an oscillator connected to one of said inverters and to one of the inputs of one of said additional pair of Nor circuits, (g) circuit means connecting the oscillator to said operating winding, (h) other circuit means connecting said contact means to the other one of the inverters and to another one of the inputs of said one of the additional pair of Nor circuits, and (i) yet other circuit means connecting the inverters to other ones of the inputs of the other one of said additional pair of Nor circuits.

References Cited by the Examiner

UNITED STATES PATENTS

| | | | |
|---|---|---|---|
| 2,309,044 | 1/1943 | Burton | 324—28 |
| 2,833,983 | 5/1958 | Shaw | 324—28 |

WALTER L. CARLSON, *Primary Examiner.*

JAMES W. LAWRENCE, *Examiner.*

G. L. LETT, *Assistant Examiner.*